May 4, 1965 H. R. SMITH, JR 3,181,209
FOIL PRODUCTION
Filed Aug. 18, 1961
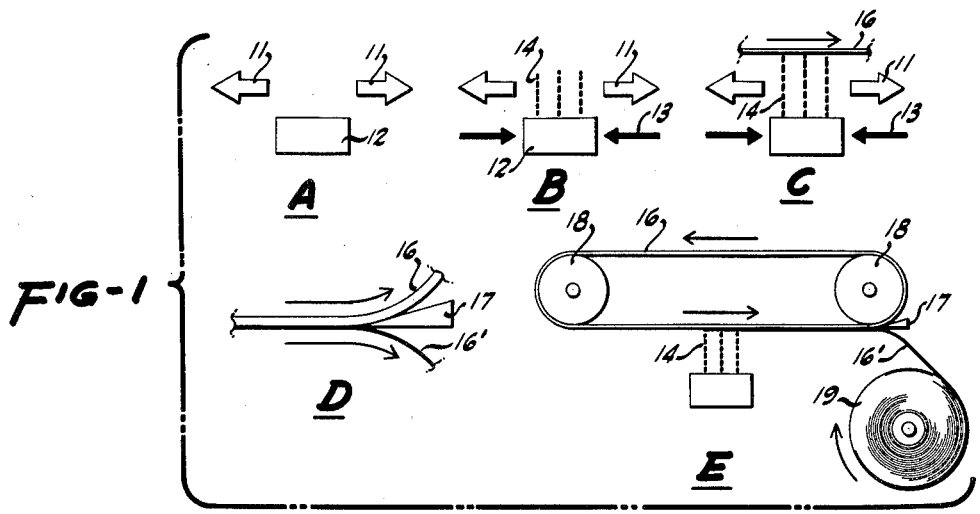
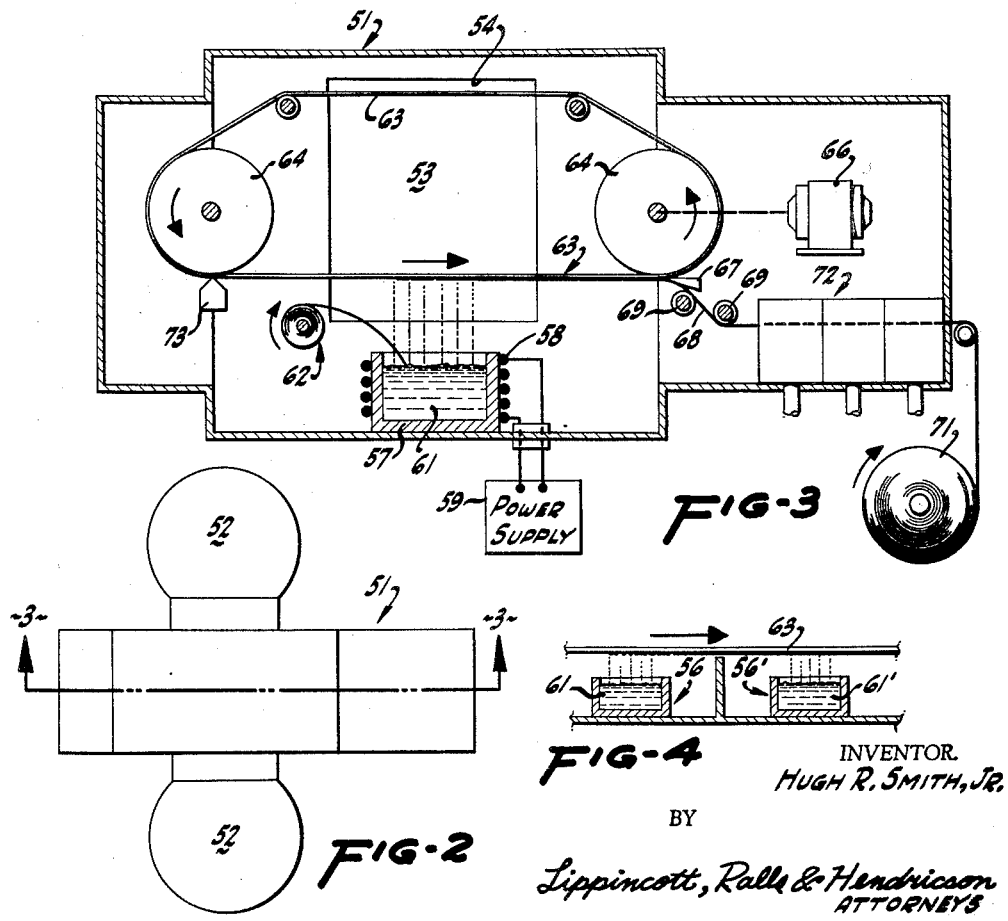
INVENTOR.
HUGH R. SMITH, JR.
BY
Lippincott, Ralls & Hendricson
ATTORNEYS

United States Patent Office 3,181,209
Patented May 4, 1965

3,181,209
FOIL PRODUCTION
Hugh R. Smith, Jr., Piedmont, Calif., assignor to Temescal Metallurgical Corporation, Berkeley, Calif., a corporation of California
Filed Aug. 18, 1961, Ser. No. 132,423
8 Claims. (Cl. 22—57.4)

The present invention relates in general to method and apparatus for manufacturing thin foil, and in particular, to a vapor deposition process for such manufacture.

In the production of very thin sheets or foil of material such as metal, for example, it is conventional to employ rolling operations wherein a relatively thick sheet is operated upon in successive steps to reduce the cross-section thereof as by hot rolling. This method of manufacture is quite satisfactory insofar as many materials are concerned, however it does have the serious disadvantage of substantial cost, particularly as regards the production of quite thin foils. Furthermore, it is difficult, if not impossible, to produce foils having a thickness of a fraction of a thousandth of an inch. In conventional foil production, the cost increases with decrease in foil thickness, inasmuch as a reduction in thickness is only attained by successive rolling steps. Furthermore, difficulty is encountered in the production of various types of foils owing to the nature of the materials to be operated upon. Thus, in a field of electrical equipment, so-called "electrical foils" employed in the manufacture of various devices, such as capacitors, are extremely expensive owing to the considerable difficulty in handling of the metal. The limitations above noted are even more severe in the production of non-metallic foils, for many materials do not readily lend themselves to rolling operations. As a consequence, various types of possibly highly desirable foils are wholly unavailable, insofar as commercial quantities thereof are concerned.

The present invention is directed to the production of foil of any desired thickness through vapor deposition processing. In accordance herewith, the material of the foil is built up from zero thickness so that minimum processing is required for the thinnest foil. This will be seen to be directly opposite to conventional manufacturing procedures, and to thus afford a very substantial advantage thereover. In accordance herewith, there is not only provided a method of foil manufacture which is highly advantageous from an economical standpoint, but furthermore, there is provided a manner of forming foils from materials which hitherto were substantially unavailable in foil form. Aside from materials other than metal included in the foregoing, are metals of particularly difficult nature to operate upon, such as certain of the refractory metals. It is well known that numerous metals have extremely high temperature characteristics, so that rolling operations, for example, are quite unsuited for the mass production of elements from such metals. In this category there is found, for example, titanium, which has highly desirable electrical properties and is thus admirably suited for certain applications, such as in the production of electrical capacitors. The above-noted application requires the provision of titanium in the form of very thin foil, and the present invention is particularly adapted to the production of such a foil, as well as thin foils of many other materials.

Many manufacturing processes also require the provision of a plurality of foils of different material which are normally combined after initial manufacture of the foils, to thereby form some sort of a sandwich structure, for example. This is true in the above-noted example of electrical capacitor manufacture, wherein it is desired to layer electrically conducting material in foil form with a dielectric material also in foil form. While various alternative approaches to a solution of this problem have been advanced in the past, there is provided by the present invention for the production of multi-layered foils in a single operation, so that resultant fabrication or manufacturing operations may be very materially simplified. It is possible in accordance herewith, as further noted below, to produce a very thin metal foil having, for example, a very thin adherent coating or attached foil of another material, such as a dielectric. This resultant product then is particularly well adapted for many applications, such as the one noted above.

The method of the present invention may be best understood by reference to illustrations of the separate steps thereof, and such is shown in the accompanying drawing, wherein:

FIGURE 1 is a schematic representation of consecutive operations performed in carrying out the method of the present invention;

FIGURE 2 is a plan view of apparatus suitable for carrying out the present invention;

FIGURE 3 is a sectional view in elevation taken in the plane 3—3 of FIGURE 2 as a further illustration of this apparatus; and FIGURE 4 is a partial sectional view of an alternative embodiment of the apparatus hereof.

The present invention, in brief, provides for the vaporization of a foil material in a vacuum. The foil material is then vapor deposited upon a substrate to a desired thickness of the resultant foil. Adhesion of this deposit is limited and the vapor deposited material is then removed from the substrate to consequently produce a foil of the thickness of material deposited upon such substrate. This process is well adapted to continuous foil production, and to precise control as to the composition and thickness of the foil produced. The invention is particularly advantageous in the production of very thin foils, having a thickness of the order of one thousandth of an inch or less.

Considering now the method of the present invention in somewhat greater detail, reference is made to FIGURE 1, wherein there is illustrated at A the evacuation of a volume above a material to be formed into a foil. Evacuation is illustrated by the block arrows 11 through the illustration of FIGURE 1, and the material to be operated upon is indicated by the block 12. As an example of operation to be carried throughout the following discussion, let it be assumed that a copper foil is to be formed. In this instance the block 12 is one of copper. Following the establishment of a substantial vacuum above the copper block 12, heat is applied to the block, as indicated by the arrows 13 at FIGURE 1B. This will be seen to serve to raise the temperature of the copper so as to melt same, at least in part, and further, to vaporize copper from the top of the block 12. This vaporization is indicated by the dotted lines 14 extending upwardly from the top of the block. It will, of course, be appreciated that the block must be supported in some manner during operation; however, this is further considered below.

From the foregoing, it will be seen that there is produced a continuous supply of vaporized copper arising from the block thereof in an evacuated volume. There is then passed over the copper block a backing or substrate, as indicated at 16 of FIGURE 1C. Vaporized material, such as copper, rising in the evacuated volume will thus be deposited upon the under surface of this substrate 16, and consequently will form a coating 16' thereon. The rate of vaporization and rate of movement of the substrate will, of course, determine the thickness of this coating. In accordance herewith, the coating deposited upon the substrate constitutes the foil produced by the present invention. In the foregoing example of copper foil production, this movable substrate may be formed of stainless steel, for example.

Following the deposition of a desired amount of material upon the under surface of the moving substrate 16, the substrate or backing is passed beyond the area of deposition and the coating upon the under surface thereof is removed, as indicated at 17 of FIGURE 1D. It is to be noted that the present invention does not operate in the manner of normal vapor deposition processes to attain a tight adherence of the deposited coating on the backing. Quite to the contrary, the present invention provides for the deposition of this coating in such a manner that same may be readily removed. As to the limitation of coating adherence, it is possible to employ a wetting agent upon the under surface of the substrate, prior to the time that it is exposed to the vapor of the depositing material. Under other circumstances, it is not necessary to employ this wetting agent, and the decision in this matter is determined by the particular materials being deposited and the identity of the backing member upon which this material is deposited. In the instance of copper foil production, it is not necessary to employ a wetting agent with a stainless steel substrate, for the copper may be relatively easily removed from the substrate under the conditions that the substrate is not unduly heated during deposition of the copper. It is preferable to maintain the backing at nominal temperature throughout processing, in accordance herewith, in order that a minimum adherence of the coating to the backing will occur.

Continuous foil production may be readily carried out, as schematically indicated at FIGURE 1E, wherein it will be seen that the backing is arranged in an endless loop as, for example, about a pair of rollers 18, so as to continuously pass over a vapor source. By continuously removing the coating deposited upon this substrate and storing same in such as a roller 19, it is then possible to form extremely large foil areas. Additionally, this continuous processing is highly desirable in the minimization of manufacturing costs.

The process of the present invention as briefly described above, is admirably suited to extremely precise control, and also to very high-quality production. The rate of vapor deposition is quite readily controlled within very narrow limits by the control of the amount of heat employed to the material or vapor source, so as to thereby control the vapor flow to the substrate thereabove. Additional control is possible by varying the rate of passage of the substrate over the vapor source. Of particular note, with respect to the present invention, is the substantial vacuum maintained throughout formation of the foil, and while a certain latitude is possible in this respect, it is yet provided by the present invention that this vacuum shall be of the order of $10^{-4}$ millimeters of mercury.

As to the foil texture, the smoothness of the substrate determines the smoothness of the upper foil surface contacting same. The texture of the under surface of the foil is controlled by the type of vapor deposition employed. With the aforementioned vacuum, there may be produced a substantially free molecular flow of vapor so that deposition occurs substantially one molecule at a time and an extremely even and smooth under surface is formed. A substantial separation of vapor source and substrate, as of the order of a few inches, together with a limited evaporation rate and high vacuum, as noted above, will produce this free molecular flow wherein almost no recombination of vapor molecules occurs prior to deposition. On the other hand, it is possible to produce a matte surface upon the foil by suitably varying the parameters to prevent this free molecular flow. An increase in evaporation rate, reduction in spacing between vapor source and substrate, or decrease in vacuum, will tend to cause a roughening of the under surface of the deposited material. This is highly desirable for many purposes, such as the improved adhesion of other materials thereto. The spacing, degree of vacuum, and the rate of vaporization are thus all available control parameters for effecting the surface finish of the foil.

As a specific example of the method hereof, aluminum is vaporized at a temperature of about 1800° C. at the surface thereof in a chamber evacuated to $10^{-4}$ millimeters of mercury. A stainless steel substrate is moved over the vapor source at a distance of about 2.5 to 3.0 inches with a sufficient rate to form an aluminum foil having a thickness of 0.5 mil to 0.2 mil. This foil has a smooth finish on the under surface, however, a matte finish may be produced by decreasing the spacing to about one inch and by increasing the temperature of the aluminum. Naturally, an increased vaporization rate requires an increased rate of substrate travel to produce the same foil thickness.

In the event that it is desirable because of the particular materials or conditions of the process to employ a wetting agent for decreasing adherence of the foil to the substrate, numerous possible agents may be employed. It is well known, for example, that a molecular film of oil upon a backing material will very seriously decrease the adhesion of vapor-deposited materials thereon. It is thus possible in the process of the present invention to employ such a wetting agent as a substantially molecular layer of oil. Innumerable alternatives exist and may be commercially procured. For example, "Peepol," manufactured by the Shell Oil Company, is well known to be a satisfactory wetting agent, and may also be employed in carrying out the present invention to decrease adhesion of the vapor-deposited material upon the substrate, so as to facilitate separation of the foil from the backing.

The process hereof is remarkably well adapted to precise control so that a wide latitude of result foil structures is possible. With a rapid-acting and carefully controlled heat source, the vaporization rate may be precisely regulated to exactly set the coating thickness. Variation in rate of travel of the substrate is also available to control foil thickness and more than one vapor condensation operation may be performed for thicker foils, if desired. Also, the vapor may be directed upon limited areas of the substrate to produce foils of varying configurations. This vapor direction may be accomplished with masks or vanes maintained at a sufficient temperature to prevent substantial vapor condensation thereon.

The above-described steps of the present invention may be carried out with a variety of different apparatus; however, there is set forth below, and illustrated in FIGURES 2 and 3 of the drawing hereof, one advantageous physical configuration of elements suitable for accomplishing continuous foil production in accordance with the present invention. This apparatus may be termed a foil furnace. Referring to these figures, there will be seen to be shown a vacuum housing 51, having vacuum pumping means 52 connected thereto and adapted to continuously evacuate the interior chamber 53 of this housing. These evacuation means may, for example, comprise a plurality of diffusion pumps or any other suitable means for maintaining a substantial vacuum within the chamber 53 and evacuation may be best accomplished by the provision of quite large evacuation ports 54 in the vacuum housing 51. Within the housing there is disposed a vapor source 56 which may take any one of a variety of configurations, and the one illustrated includes a crucible or container 57 adapted to contain material for evaporation and having heating means 58 associated therewith for the melting and vaporization of such material. These heating means may, for example, merely comprise resistance wiring about the crucible fed from a suitable power supply 59 normally disposed exteriorly of the housing. In the circumstances wherein the material 61 disposed in the vapor source for vaporization has a relatively low boiling point, the foregoing heating means are quite suitable. There may, of course, be employed induction heating means or, in certain instances, it is desirable to utilize more concentrated and higher temperature means for vaporizing high-temperature metals. Thus, for example, if titanium is to be vaporized, it is preferable to employ bombardment heating wherein such as an electron beam of high current is directed into the container of the vapor source, in order to supply the requisite heat for vaporization. Also, it is possible to provide for the continuous replenishment of the material within the vapor source in order to prolong the period of continuous processing without the necessity of gaining access to the interior of the evacuated chamber 53. This is schematically illustrated at 62 as a coil, for example, of wire which may be controllably fed into the vapor source to thereby serve as a very substantial quantity of material for vaporization. Also, the vapor source may be elongated to provide a greater vaporization area, and thus a thicker coating or more rapid foil production.

In addition to the foregoing portions of the apparatus, there is provided a belt or elongated strip of material 63, which is adapted to be passed over the vapor source to receive vapor for deposition thereon. This strip 63 then serves as the substrate discussed above to accommodate coating by the vapor and subsequent separation therefrom, so as to constitute this coating as the foil product of the process. As illustrated, this strip 63 is extended about rollers 64 which may be mounted within the vacuum chamber 53 or extensions thereof. Although it is possible to mount these rollers 64 outside of the vacuum chamber, maintenance of the vacuum then becomes a problem so that vacuum sealing and differential pumping are required. Suitable drive means are provided for one or more of the rollers, in order to continuously move the strip 63 over the vapor source 56. An electric motor 66 may be employed as drive means for one or more rollers carrying the strip 63, and the use of a variable speed motor affords control over the rate of substrate passage over the vapor source to control coating thickness. Under certain circumstances, it is also desirable to remove the return path of the strip sufficiently far from the vapor source so as to insure the absence of vapor deposition thereon and for this purpose guide means may be employed, as indicated.

As a further element of the foil furnace illustrated in FIGURES 2 and 3, there is provided means for separating the vapor-deposited coating from the moving strip 63. This may, for example, take the form of a knife-edge element 67, preferably displaced from the region of substantial vapor concentration, and oriented to engage the under surface of the strip or substrate 63 as this substrate moves beyond the vapor source carrying upon the under surface thereof the coating previously deposited. As the coated strip 63 passes over the knife-edge or other separation means 67, the coating will be peeled from the strip as a foil, and such foil 68 is then passed over suitable guide means, such as indicated at 69, and may be wrapped about a roll, or the like 71. Under the circumstance that the foil is to continuously emerge from the furnace during production, suitable vacuum sealing means are required and this may include differential pumping stages through which the foil is passed, as schematically indicated at 72. This then provides the foil in position for ultimate utilization, storage, or further processing outside of the foil furnace described.

Operation of the apparatus, above described as a foil furnace, follows the step of the method heretofore set forth. With material such as, for example, aluminum, disposed in the vapor source 56, and with the strip 63 moving over this vapor source as urged by one or more of the strip rollers 64, it will be seen that vaporization of the aluminum through the application of heat thereto will cause a vapor to rise, as indicated. Within the chamber there is maintained a very substantial vacuum as, for example, of the order of 0.1 micron of mercury. This vacuum is maintained throughout processing with the exception of certain control variations therein, as otherwise noted. The vapor arising from the source 56 is deposited as a coating upon the under surface of the strip 63 moving across the top of the vapor source. With the maintenance of a high vacuum within the chamber 53, a limited evaporation rate, and a reasonable vapor path, substantially no bunching of the vaporized aluminum molecules will occur. Consequently, there will be produced a substantially molecular or atomic deposition of material upon the under surface of the strip to form a very smooth coating thereon. The thickness of this coating is readily controlled through the control of the vapor source. This requires only a control over the heat applied over the source to thereby establish the amount of vapor generated, and inasmuch as substantially all vapor generated in a source moves perpendicularly upward thereof into contact with the moving strip 63, it will be appreciated that a very precise control over the amount of deposited vapor is readily available. It is also possible to vary the rate of travel of the strip 63 to provide further control in this respect. As the material, such as aluminum, is deposited upon the substrate strip 63 moving across the vapor source, there is thus produced a foil of precisely predeterminable thickness, and this foil is then separated from the substrate at 67.

After separation from the substrate, foil 68 is subsequently led to suitable storage means such as, for example, a roll which is driven to insure satisfactory take-up of the foil. It is, of course, possible to provide alternative foil handling means, such as cutting equipment, to produce sheets of predetermined size. Replenishment of the vapor source with further material for vaporization may be readily accomplished as, for example, in the manner suggested above. Furthermore, it is possible and, in fact, under certain circumstances desirable to apply a wetting agent to the under surface of the substrate strip 63 prior to deposition of vapor thereon. This also may be automatically accomplished within the furnace by the provision of a source of wetting agent 73 disposed in engagement with the strip ahead of the vapor source, in this instance to the left of the vapor source wherein the strip is presumed to be moving to the right thereof, as indicated by the arrow. Only a very minute amount of any wetting agent is ordinarily required to be applied to the strip in order to sufficiently limit adhesion of the vapor coating to the strip for facile separation of these two.

The present invention is particularly adaptable to the formation of foil from refractory or high-temperature metals. Under the circumstances wherein titanium, tantalum, or possible even tungsten foil is desired to be produced, it is of course necessary to apply sufficient heat to the vapor source for vaporization of these metals. Many conventional heat sources are insufficient for this application, and as above suggested, it is possible to herein employ bombardment heating wherein such as a high-energy electron beam is focused into the top of the containing crucible of the source. This produces a limited melting of the upper surface of refractory metal in the crucible and a controlled vaporization thereof. Under such circumstances, it is desirable to employ a cooled crucible which may, for example, be formed of copper with cooling tubes therein in order to prevent melting of the container. This manner of heating affords very precise control over the amount of vapor generated and thus over the process as a whole.

Not only does the process hereof provide for highly economic foil production, but also provides for the deposition of extremely pure material as the foil. It will be appreciated that vaporization processing is suitable for purification and separation of materials, and consequently, foil production in accordance herewith may be readily controlled to insure the deposition of only the single or multiple elements desired. Thus, for example, copper may be vaporized from a mixture of copper and impurities having a higher boiling point by maintaining a proper vapor source temperature so that only copper vaporizes and pure copper foil is produced. Likewise, gases included in the source material are removed during vaporization. Further, the formation of the foil practically molecule-by-molecule, or atom-by-atom, will be seen to produce an extremely fine structure of the deposited coating. This highly advantageous foil structure is attained herein without departing from the essential process steps and does, in fact, naturally result from the method hereof.

Any and all materials which may be vaporized are suitable for utilization in the process of the present invention for the production of foils therefrom. This then clearly applies to non-metals as well as metals, and also applies to innumerable compounds. Should it be desired, for example, to form a foil of a metal oxide, it is possible to vaporize such compound, and in the instance wherein dissociation of the compounds is experienced there may be additionally introduced gaseous constituents thereof that might otherwise not appear in sufficient quantity in the deposited layer. Thus, in the example of an oxide coating, subsequently separated to form a foil, there may be bled into foil furnace immediately adjacent the area of vapor deposition, a small stream of oxygen. This has been found to overcome oxygen depletion resulting from vaporization of the oxide.

Upon the surface of the moving substrates, there are condensed the molecules vaporized in the vapor source and moving upwardly therefrom into contact with this substrate strip. Intentional limitation of the adhesion between the vapor coating produced and the material upon which it is formed, then serves to facilitate separation of the substrate and coating so that this coating then becomes a separate foil having utility of its own. The resultant foil produced by the present invention is not readily discernible as having ever been a coating at all, aside from the fact that the quality of the foil is substantially superior to foils formed in other manners. It will be appreciated that the thickness of the foil is not only readily controllable herein, but is also readily minimized to any desired extent. The process thus provides for the production of foils as thin as desired, the only limitation being the ability of the foil material itself to hold together. Metal foils having a thickness of 0.20 mil have been statisfactorily formed. Of particular note in this respect is the fact that no additional expense is involved in this production of extremely thin foils, and furthermore, that the uniformity of the foils does not vary in accordance with its thickness.

As regards the applicability of the present invention in the production of multi-layer foils, it will be readily appreciated that the foil furnace described above, for example, may be provided with more than one vapor source disposed along the path of the substrate strip 63. The method or process hereof then includes the additional step of condensing upon the coating of the moving substrate an additional coating over the one first formed. As an example of a highly desirable product of manufacture in accordance herewith, there may, for example, be produced a copper coating upon the substrate followed by the deposition of a dielectric material upon this copper coating in the form of a film thereover. Subsequent separation of the combined copper and dielectric coatings from the substrate will thus be seen to produce a composite foil having copper on one side and a dielectric on the other. Adhesion of the portions of the foil are controlled by the suitable choice of materials, and it is noted that the majority of vaporizable materials that would normally be employed in the present invention will staisfactorily adhere to each other. This then indicates the advisability of particularly choosing the substrate strips that minimum adhesion will result between the coating and substrate, for otherwise it may be very difficult to remove the coating as a foil. It has been found that stainless steel is highly desirable in this respect, and does form a highly suitable substrate strip material. The invention is, of course, not limited to the utilization of stainless steel as a backing or strip member, for various other metal or glasses of sufficient structural strength may be employed and in the instance wherein undue adhesion is possible, a suitable wetting agent is applied to the strip prior to the deposition of a coating thereon.

FIGURE 4 illustrates a pair of vapor sources 56 and 56' in a foil furnace with the substrate 63 passing over each vapor source. With one material 61 vaporized from the source 56 and deposited on the substrate, subsequent vapor deposition of the other material 61' will thus produce a double layer coating. Removal of the coating from the substrate then forms a foil having one material on one side and another material on the other side.

It will be seen from the foregoing brief description of the present invention that there is provided hereby a material advancement in the art. It is possible in accordance herewith to economically produce extremely high-quality thin foils of a wide variety of materials and of precisely controllable thickness. Additionally, there is herein provided an improved foil furnace, which is readily adapted for carrying out the process of the present invention and which likewise clearly distinguishes from conventional foil-production means.

What is claimed is:

1. A method for the continuous manufacture of a thin self-supporting foil of uniform thickness comprising, evacuating a vacuum chamber to a low pressure, vaporizing a foil material within the vacuum chamber, moving an endless substrate positioned within the vacuum chamber so as to intercept the foil material vapors and condense the foil material vapors thereon in the form of a thin uniform coating, removing the coating from the substrate within the vacuum chamber in the form of a thin uniform self-supporting foil, and passing the foil out of the vacuum chamber through differential vacuum pumping stages, whereby the flow of air into the vacuum chamber is substantially prevented.

2. A method for the continuous manufacture of a thin self-supporting foil of uniform thickness comprising, evacuating a vacuum chamber to a pressure of not more than about 0.1 micron of mercury, vaporizing a foil material within the vacuum chamber, moving an endless belt substrate positioned within the vacuum chamber so as to intercept the foil material vapors and condense the foil material vapors thereon in the form of a thin uniform coating, controlling the surface characteristics of the foil by controlling the spacing of the substrate from the foil material vapor source, the degree of vacuum and the rate of vaporization of the foil material, removing the coating from the substrate within the vacuum chamber in the form of a thin uniform self-supporting foil, and passing the foil out of the vacuum chamber through differential vacuum pumping stages, whereby the flow of air into the vacuum chamber is substantially prevented.

3. A method for the continuous manufacture of a thin self-supporting multi-layer foil of uniform thickness comprising, evacuating a vacuum chamber to a pressure of not more than about 0.1 micron of mercury, vaporizing a first foil material within the vacuum chamber, moving an endless belt substrate positioned within the vacuum chamber so as to intercept the first foil material vapors and condense the first foil material vapors thereon in the form of a thin uniform coating, vaporizing a second foil material within the vacuum chamber, moving the endless substrate having a coating of the first foil material thereon so as to intercept the second foil material vapors and condense the second foil material vapors upon the first foil material coating in the form of a thin uniform coating to form a multi-layer coating on the substrate, stripping the multi-layer coating from the substrate within the vacuum chamber in the form of a thin uniform self-supporting multi-layer foil, and passing the multi-layer foil out of the vacuum chamber through differential vacuum pumping stages, whereby the flow of air into the vacuum chamber is substantially prevented.

4. A method for the continuous manufacture of a thin self-supporting foil of uniform thickness comprising, evacuating a vacuum chamber to a pressure of not more than about 0.1 micron of mercury, vaporizing a foil material within the vacuum chamber, moving an endless belt substrate positioned within the vacuum chamber so as to intercept the foil material vapors and condense the foil material vapors thereon in the form of a thin uniform coating, controlling the surface characteristics of the foil by controlling the spacing of the substrate from the foil material source, the degree of vacuum and the rate of vaporization of the foil material, applying a wetting agent to the endless belt substrate prior to interception of the substrate with the foil material vapors to reduce adhesion between the substrate and the coating, removing the coating from the substrate within the vacuum chamber in the form of a thin uniform self-supporting foil, and passing the foil out of the vacuum chamber through differential vacuum pumping stages, whereby the flow of air into the vacuum chamber is substantially prevented.

5. An apparatus for the continuous manufacture of a thin self-supporting foil of uniform thickness comprising, a vacuum chamber, vacuum pumping means for evacuating said chamber to a low pressure, a crucible within said chamber for receiving a foil material to be vaporized, means for heating said crucible to vaporize the foil material, a moveable endless belt substrate within said chamber disposed above said crucible, means for moving said substrate so as to intercept the foil material vapors and deposit a thin uniform coating of foil material thereon, means within said chamber adjacent said substrate for removing the coating from said substrate in the form of a thin self-supporting foil web, vacuum sealing means adjacent and exit opening from said chamber, and means for passing the foil out of said chamber through said vacuum sealing means and said exit, whereby foil may be continuously manufactured and removed from the vacuum chamber.

6. An apparatus for the continuous manufacture of a thin self-supporting foil of uniform thickness comprising, a vacuum chamber, vacuum pumping means for evacuating said chamber to a pressure of not more than about 0.1 micron of mercury, a crucible within said chamber for receiving a foil material to be vaporized, means for heating said crucible to vaporize the foil material, a moveable endless stainless steel belt substrate within said chamber disposed above said crucible, means for moving said substrate so as to intercept the foil material vapors and deposit a thin uniform coating of foil material thereon, means within said chamber adjacent said substrate for removing the coating from said substrate in the form of a thin self-supporting foil web, a plurality of differential vacuum pumping stages adjacent an exit opening from said chamber, and means for passing the foil out of said chamber through said differential vacuum pumping stages and said exit, whereby foil may be continuously manufactured and removed from the vacuum chamber.

7. An apparatus for the continuous manufacture of a thin self-supporting foil of uniform thickness comprising, a vacuum chamber, vacuum pumping means for evacuating said chamber to a pressure of not more than about 0.1 micron of mercury, a crucible within said chamber for receiving a foil material to be vaporized, means for heating said crucible to vaporize the foil material, a moveable endless stainless steel belt substrate within said chamber disposed above said crucible, means for moving said substrate so as to intercept the foil material vapors and deposit a thin uniform coating of foil material thereon, applicator means within said chamber adjacent said substrate for applying a wetting agent to the surface of the substrate prior to interception of the substrate with the foil material vapors, means within said chamber adjacent said substrate for removing the coating from said substrate in the form of a thin self-supporting foil web, a plurality of differential vacuum pumping stages adjacent an exit opening from said chamber, and means for passing the foil out of said chamber through said differential vacuum pumping stages and said exit, whereby foil may be continuously manufactured and removed from the vacuum chamber.

8. An apparatus for the continuous manufacture of a thin self-supporting multi-layer foil of uniform thickness comprising, a vacuum chamber, vacuum pumping means for evacuating said chamber to a pressure of not more than about 0.1 micron of mercury, a moveable endless stainless steel belt substrate within said chamber disposed above said crucible, at least one generally vertical barrier extending from the floor of said chamber and terminating adjacent said substrate, first and second crucibles on opposite sides of said barrier for receiving foil materials to be vaporized, means for heating each of said crucibles to vaporize the foil materials, means for moving said substrate so as to successively intercept the foil material vapors from said first crucible and said second crucible and deposit a thin uniform multi-layer coating of foil materials thereon, means within said chamber adjacent said substrate for removing the multi-layer coating from said substrate in the form of a thin self-supporting multi-layer foil web, vacuum sealing means adjacent an exit opening from said chamber, and means for passing the multi-layer foil out of said chamber through said vacuum sealing means and said exit, whereby multi-layer foil may be continuously manufactured and removed from the vacuum chamber.

References Cited by the Examiner

UNITED STATES PATENTS

| 1,321,658 | 11/19 | Mellen | 22—57.4 |
|---|---|---|---|
| 2,382,432 | 8/45 | McManus et al. | |
| 2,405,662 | 8/46 | McManus et al. | 117—107 |
| 2,423,729 | 7/47 | Ruhle. | |
| 2,639,490 | 5/53 | Brennan | 22—57.3 XR |
| 2,701,901 | 2/55 | Pawlyk | 22—57.4 XR |
| 2,714,235 | 8/55 | Brennan | 22—57.4 |
| 2,857,637 | 10/58 | Winters | 22—57.4 |
| 2,978,761 | 4/61 | Foye et al. | 22—57.4 XR |
| 3,040,702 | 6/62 | Eng et al. | 118—49 |

FOREIGN PATENTS 754,102   8/56   Great Britain.

MICHAEL V. BRINDISI, *Primary Examiner.*

MARCUS U. LYONS, WINSTON A. DOUGLAS,
*Examiners.*